(No Model.)  2 Sheets—Sheet 1.
W. A. SHAW.
SYSTEM FOR TRANSMITTING AND DISTRIBUTING ELECTRICAL ENERGY.
No. 303,891.  Patented Aug. 19, 1884.
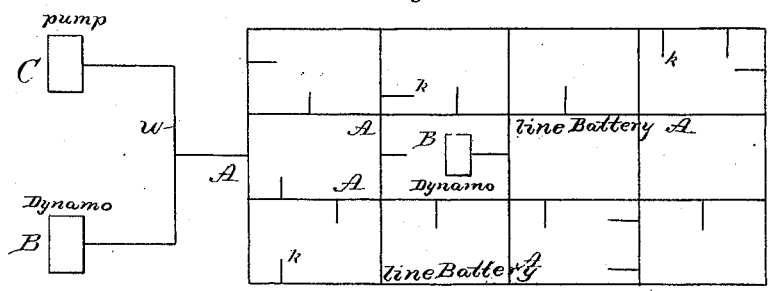
Fig. 1.
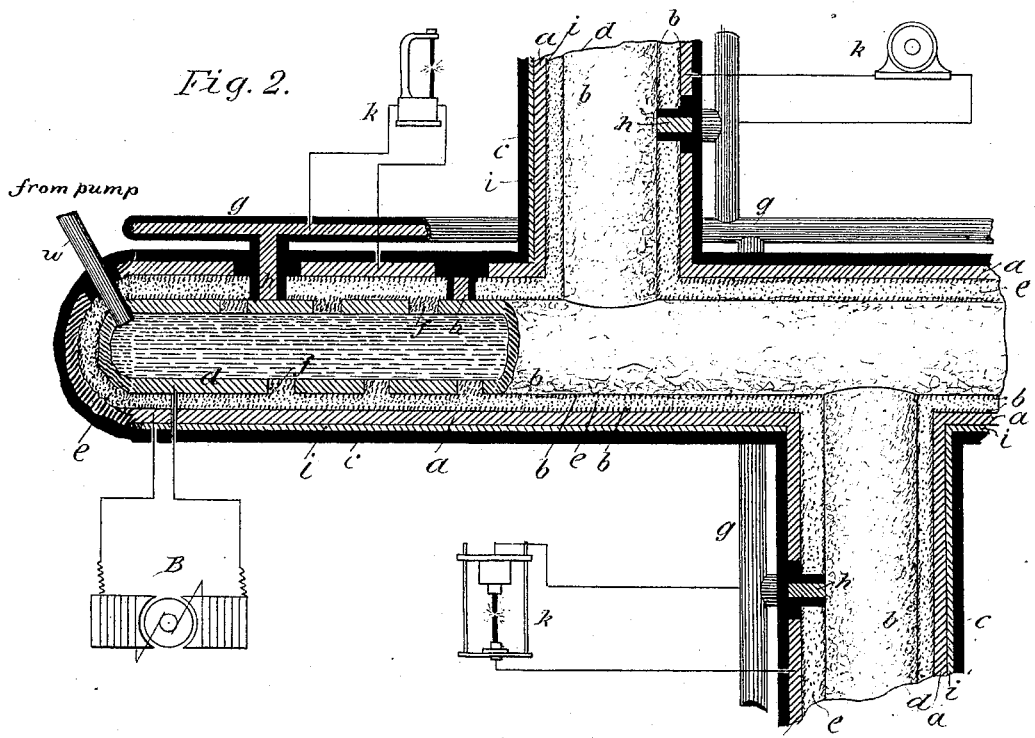
Fig. 2.
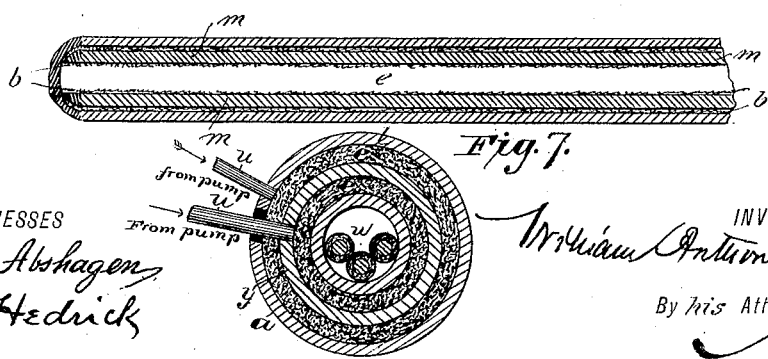
Fig. 3.
Fig. 7.
WITNESSES
Ernest Abshagen
C. J. Hedrick
INVENTOR
William Anthony Shaw
By his Attorney

UNITED STATES PATENT OFFICE.

WILLIAM ANTHONY SHAW, OF BROOKLYN, ASSIGNOR TO THE ELECTRICAL ACCUMULATOR COMPANY, OF NEW YORK, N. Y.

SYSTEM FOR TRANSMITTING AND DISTRIBUTING ELECTRICAL ENERGY.

SPECIFICATION forming part of Letters Patent No. 303,891, dated August 19, 1884.

Application filed April 21, 1882. (No model.)

*To all whom it may concern:*

Be it known that I, WILLIAM ANTHONY SHAW, of Brooklyn, Kings county, New York, have invented a certain new and useful Improvements in Systems for Transmitting and Distributing Electrical Energy, of which the following is a full description.

This invention relates more particularly to the distribution of electrical energy for lighting, for driving machinery, and for other purposes; and it consists in a combined system of batteries and conductors.

The invention contemplates more particularly the use of secondary or storage batteries, the electrodes of which serve as well to conduct as to accumulate or store the electrical energy supplied by dynamo or magneto electric machines, or from other suitable source. These combined batteries and conductors, or "line-batteries," as they will be called herein, consist of a continuous battery or a number of batteries connected by conductors, or of both. The simplest and one of the most convenient and efficient forms consists of a pipe forming one electrode of the battery and inclosing the other battery-electrode and the electrolyte. Another mode of construction is to inclose the electrode conductors and the electrolyte in a pipe of non-conducting material. When a number of batteries are used, they are preferably placed at proper intervals apart, depending on the size and character of the battery, and are connected with the distributing-conductors in derivation or multiple arc, the required tension or electro-motive force being secured by the internal construction of the several batteries. It is, however, practicable to arrange the line-batteries, when provided as well with divided as with continuous electrodes, so that the electro-motive force can be varied by proper coupling of the electrodes in series, and electricity of different tension supplied at different points. The electrodes of the secondary or storage batteries may be of any known or suitable material adapted for use in such batteries, but are preferably of plates of lead or lead alloy coated with red lead or other oxide or compound of lead.

The nature and design of the invention having been now set forth in a general way, a description will now be given, with the aid of the accompanying drawings, showing more in detail the manner of carrying the principles enunciated into effect and explaining parts of the invention omitted from the foregoing general description.

Figure 1 of said drawings is a diagram illustrating the general plan of a system of electrical distributers in accordance with the invention, and Fig. 2 a section illustrating in detail a portion of a line-battery. Figs. 3, 4, 5, and 6 represent different forms of a continuous line-battery, and Fig. 7 shows a system wherein a number of small cells are used in place of a line-battery.

A is a line-battery comprising main trunks and lateral branches of different size, reaching to all parts of a city or district to be supplied with electricity.

B represents the dynamo-electric machines, and C indicates a pump for forcing water or other liquids through suitable pipes to supply the electrolytic liquid to the battery.

Referring to Fig. 2, the line-battery consists of an exterior tubular electrode or pipe, $a$, (say of lead,) having a coating, $b$, of red lead or other active material on its interior, and embedded in insulating material $c$, and an interior electrode, $d$, formed of a perforated lead pipe coated exteriorly with red lead or other active material, $b$, and a filling and separating medium, $e$, formed of, say, a mixture in equal portions of earth and alkaline nitrate, (nitrate of potash or soda, or both.) The perforations $f$ in the inner electrode. $d$, allow water or other fluid forced into said electrode by the pump C through the pipe $u$, or by other suitable means, to pass through the walls of the electrode and moisten the separating medium $e$. The two electrodes are connected with opposite poles of a dynamo-electric machine, B, or of a number of such machines at different parts of the system. It is obvious that any part of the district supplied by such system can obtain a supply of electricity by tapping the line-battery. In order, however, to avoid the necessity of cutting through the walls of the exterior electrode wherever a battery-connection is desired, an insulated conductor, $g$, is run along the line and connected by offshoots $h$ with the interior electrode, $d$, so that when a connection is desired it is only necessary to connect this conductor $g$ with one pole of the electric light, motor, or other translating device, $k$, to be supplied, the other pole being connected with the exterior electrode.

In view of the comparative low conductivity of lead, it is well to combine with the electrodes a material of better conducting capacity, such as copper or iron. The conductor $g$, which may be made of such material, serves to reduce the resistance of the inner electrode, (acting as a conductor for the current for the machine B,) as well as to furnish a ready means for making service-connections. The strip $i$, let into the exterior electrode, has a similar function.

Instead of the filling and separating medium of a salt and absorbent material, $e$, the space between the electrodes may be filled with inactive absorbent material—asbestus, cloth, sponge, paper, leather, &c.—which will be wet by suitable electrolytic liquids introduced through the inner electrode. An imperforate inner electrode may also be used. The bore of the inner electrode could also be used to contain telephone or telegraph wires or other conductors, or the inner electrode could be made solid. An imperforate inner tubular electrode is shown in cross-section at $d^*$, Fig. 6, and a solid inner electrode at $r$, Fig. 5. The electrolytic liquid in either case is introduced by the tube $u$ into the annular space surrounding the inner electrode.

In Fig. 6 a number of electrical wires, $w$, covered with insulating material, are inclosed in the inner electrode.

For convenience of manufacture, the imperforate inner electrode is preferred, as continuous lengths of the line-battery may be pressed out at once from a suitable pipe-press. This matter will, however, form the subject of a separate application, filed May 13, 1882, and officially numbered 61,269, to which reference may be had. After manufacture, the holes for the offshoots or connections $h$ may be bored. The angular joints at the corners of streets may be made of cast or partly of cast and partly of drawn metal.

It is evident that a line-battery organized as described may be of any size, section, or length, from large mains receiving and giving off immense stores of electricity down to small tubes that may be carried upon telegraph-poles and used in place of the ordinary conductors. These lines can be substituted with great advantage not only for the usual telegraphic or telephonic conductors, but also for the solenoid-circuits recently introduced. For transmission of signals or communication of any kind, one end of the line would be connected with the positive electrode and the other end with the negative electrode, the line itself being of any desired length. The battery would constitute both the battery and the return-conductor.

Fig. 3 represents in horizontal section a line-battery consisting of a tube, $l$, of glass, wood, clay, earthenware stone, artificial stone, metal, or other material, and two parallel electrodes, $m$, inclosed therein, said electrodes being coated with red lead or other active material, $b$, and separated by a filling medium, $e$.

Figure 4:
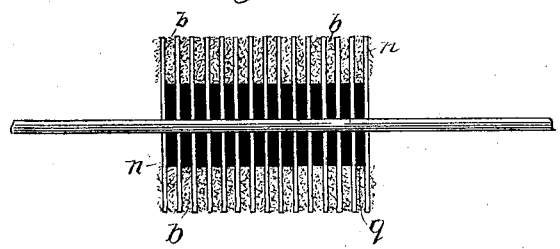

Fig. 4 shows an interior electrode, formed of disks $n$, strung on a rod, $p$, separated by disks $q$, of paper, parchment, paper-cloth, &c., and coated with active material $b$. The disks $q$ are represented in solid black. They are of smaller diameter than the disks $n$, and the active material is placed in the annular spaces around the edges of the disks $q$, between the projecting margins of the disks $n$. The electrode may be supported in an inclosing tubular electrode, like the electrode $d$, Fig. 2, or like the electrode $r$, Fig. 5.

Figure 5:
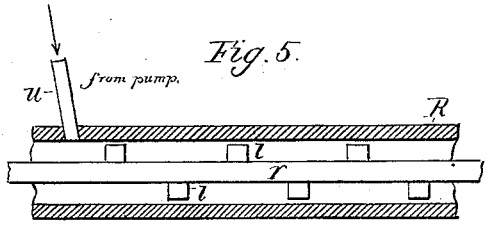
Fig. 5 shows an inner electrode, $r$, inclosed in a tube, R, which constitutes the outer or opposing electrode, and separated therefrom by blocks $t$ of insulating material.
Figure 6:
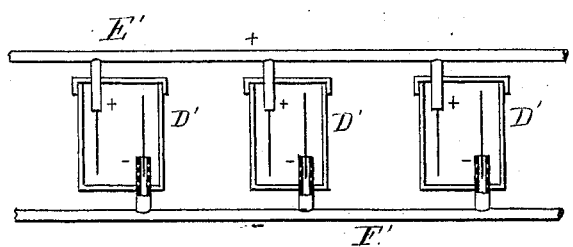

In Figs. 2, 3, and 5 only two electrodes are shown; but it is obvious that the number may be increased. One mode of increasing the number is illustrated in Fig. 6, in which, between the exterior tubular electrode, $a^*$, and the inner one, $d^*$, is an intermediate tube, $y$, which constitutes a double electrode, making one voltaic couple with the interior electrode, $d^*$, and another with the electrode $a^*$. The electrodes are separated by porous filling material $e$. The exciting or electrolytic liquid is introduced by the pipe $u$ into the space between the electrodes $y$ and $d^*$, and by the pipe $u'$ into the space between electrodes $y$ and $a^*$.

Instead of a line-battery in which the electrodes also serve as distributing-conductors of electricity, or as electrodes, distributing-conductors, and distributers of the exciting-liquid, a series of separate cells in which the electrodes do not act as conductors distributing the electricity may be used, and the invention still be employed in part, although not in whole.

In Fig. 7 the boxes D' or cases of the batteries are closed, and electrolytic liquid is circulated through them by the pipes E' F', which also serve as conductors. The inlet-pipe enters at the top, the outlet being at the bottom.

It is obvious that there are various other ways of arranging the electrodes; but the above will be sufficient both to illustrate the principles of the invention and to enable those skilled in the art to carry the same into effect.

With regard to the electrode shown in Fig. 4, no claim is made herein to the construction of the electrode itself, such claim being reserved to a separate application—to wit, to my application for improvement in secondary batteries, filed June 25, 1883, and officially numbered 99,166, but, if used in the manner described in a system of storing and distributing electricity, such use is within the scope of the present invention.

Having now fully described my said invention and the manner of carrying the same into effect, what I claim is—

1. A system of storing and distributing electrical energy, comprising one or more conductors and batteries constructed and arranged, as described, so that said conductors constitute the poles of extended elements or battery-electrodes, the lights, motors, and other translating devices utilizing continuous currents and supplied from said conductors being placed in derived branches, substantially as described.

2. In a circuit or system for transmitting or distributing electrical energy, a battery whereof the electrodes serve also as conductors, being traversed by electric currents passing through the electrodes lengthwise or breadthwise of the same, as well as by currents passing from one electrode to another through the electrolyte, the said electrodes being primarily coated with a porous layer of active material, substantially as described.

3. A line-battery having an exterior tubular electrode and one or more interior electrodes, in combination with an exterior insulated conductor connected with one of the inner electrodes, substantially as described, so that branch or service wires for taking off electricity can be connected with said insulated conductor, and do not need to be connected directly with the interior electrode, as set forth.

4. A pipe-battery constructed either of lead or other metals, with the space between its electrodes filled with solid mixture of salt and a granular inert material—such as nitrate of potassa and earth—substantially as described.

5. A pipe-line storage-battery combined with a dynamo for charging the same with electricity and a pump for supplying an exciting-liquid to it, substantially as described.

6. In a system for distributing electricity, a storage-battery provided with conductors in the form of pipes, the same serving to distribute the exciting-liquid throughout the system, in combination with a dynamo-electric machine for charging the battery with electricity and a pump for forcing the exciting-liquid throughout the system, substantially as described.

In testimony whereof I have signed this specification in the presence of two subscribing witnesses.

WM. ANTHONY SHAW.

Witnesses:
M. M. BUDLONG,
G. W. RAWSON.